US008590794B2

(12) United States Patent
Wang et al.

(10) Patent No.: US 8,590,794 B2
(45) Date of Patent: Nov. 26, 2013

(54) BARCODE RECOGNION METHOD AND COMPUTER PRODUCT THEREOF

(71) Applicant: Visionatics Inc., Tainan (TW)

(72) Inventors: Chi-Chen Wang, Tainan County (TW); Chien-Chung Tseng, Tainan (TW); Jenn-Jier Lien, Kaohsiung (TW)

(73) Assignee: Visionatics Inc., Tainan (TW)

( * ) Notice: Subject to any disclaimer, the term of this patent is extended or adjusted under 35 U.S.C. 154(b) by 0 days.

(21) Appl. No.: 13/802,591

(22) Filed: Mar. 13, 2013

(65) Prior Publication Data

US 2013/0256416 A1    Oct. 3, 2013

(30) Foreign Application Priority Data

Mar. 27, 2012    (TW) .............................. 101110616 A

(51) Int. Cl.
*G06K 5/04* (2006.01)
(52) U.S. Cl.
USPC .................. 235/462.08; 235/462.01; 235/454

(58) Field of Classification Search
USPC ................ 235/462.08, 462.01, 454, 435, 439
See application file for complete search history.

(56) References Cited

U.S. PATENT DOCUMENTS

| 2005/0067496 | A1* | 3/2005 | Yen et al. ................. 235/462.08 |
| 2007/0242883 | A1* | 10/2007 | Kruppa ........................ 382/181 |

* cited by examiner

*Primary Examiner* — Edwyn Labaze
(74) *Attorney, Agent, or Firm* — CKC & Partners Co., Ltd.

(57) ABSTRACT

A barcode recognition method and a computer program product thereof are provided. In the barcode recognition method, at first, a foreground extraction step is performed to obtain a binary image of a barcode image. Thereafter, an alignment step is performed to calculate a center coordinate, corner coordinates, a shift vector, and a rotation angle of the target barcode in accordance with the barcode image, the binary image, the shift vector, and the rotation angle. Thereafter, positions of data space patterns, boundary patterns, and an alignment type of the target barcode are determined in accordance with the center coordinate, the corner coordinates, the shift vector, and the rotation angle of the target barcode. Then, values of the target barcode are determined in accordance with the positions of the data space patterns, the boundary patterns, and the alignment type of the target barcode.

14 Claims, 14 Drawing Sheets

330 start

↓ finding at least one single barcode pattern in the foreground image — 331

↓ selecting a target barcode pattern — 332

↓ extracting an image of the target binary barcode pattern — 333

↓ performing a rotation angle calculating step to calculate a value of a rotation angle — 334

↓ rotating the frame template pattern by the value of the rotation angle — 335

↓ extracting a target barcode image from the barcode image — 336

↓ correcting the target barcode pattern of the target barcode image — 337

↓ end

Fig. 4

BARCODE RECOGNION METHOD AND COMPUTER PRODUCT THEREOF

RELATED APPLICATIONS

This application claims priority to Taiwan Application Serial Number 101110616, filed Mar. 27, 2012, which is herein incorporated by reference.

BACKGROUND

1. Field of Invention

The present invention relates to a barcode recognition method and a computer program product thereof. More particularly, the present invention relates to a barcode recognition method of micro beads and a computer program product thereof.

2. Description of Related Art

Micro bead technology is a labeling technology used in experiments of gene and chemistry to provide flexible representation of information. Because the micro bead has a very small volume (about to one cubic nanometer), thousands of the micro beads can be placed into a very small regent vessel to represent information of the regent vessel, such as ingredients contained in the regent vessel.

In order to read the data of the micro beads, a microscope is required to obtain images of the micro beads, and a computer is used to analyze the images of the micro beads for recognition of values of the pattern on the micro beads. However, because the material of the micro bead is transparent and the micro beads are distributed irregularly in the regent vessel, present barcode recognition methods cannot quickly recognize the values of the patterns on the micro beads, and also the accuracy of the present barcode recognition methods is not good enough.

Therefore, there is a need for a new barcode recognition method to increase the speed and accuracy of the recognition of the micro bead.

SUMMARY

An aspect of the present invention is to provide a barcode recognition method and a computer program product thereof to exclude overlapped micro beads and micro beads which cannot be identified, and to perform analysis on other micro beads to determine alignment modes and information validity thereof for improvement of the speed and accuracy of the recognition of the micro bead.

In the following description, micro beads are referred to as "micro barcodes" or "barcodes" for convenience of explanation.

According to an embodiment of the present invention, in the barcode recognition method, at first, a plurality of barcode template image are provided, the barcode template image includes a plurality of barcode template patterns, and the barcode template patterns having a plurality of blank area patterns, and positions of the blank area patterns are different from each other to enable the barcode template patterns correspond to a plurality of different barcode alignment modes in a one to one manner, and each of the barcode template patterns has a plurality of data boundary patterns and at least one data space template patterns. Thereafter, a foreground extraction step is performed to extract a foreground image from the barcode image, wherein the foreground extraction step performs a binarization process on the barcode image.

Then, a pre-alignment processing step is performed. In the pre-alignment processing step, at first, a single barcode finding step is performed by using a connected component labeling (CCL) algorithm and a template geometric condition of a frame template pattern to find at least one single barcode pattern in the foreground image, wherein the frame template pattern is in a frame template image, and the frame template pattern is a frame pattern of one of the barcode template patterns. Then, a target binary barcode to pattern is selected from these single barcode patterns. Thereafter, an image of the target binary barcode pattern is extracted from the foreground image. Then, a rotation angle calculating step is performed to calculate a value of a rotation angle between an alignment direction of the target binary barcode pattern and an alignment direction of the frame template pattern. Thereafter, a rotating step is performed to rotate the frame template pattern by the value of the rotation angle with respect to a center point of the frame template pattern as a center to obtain a rotated frame template pattern and a rotated frame template image, wherein the rotated frame template pattern is in the rotated frame template image. Then, target barcode image is extracted from the barcode image in accordance with the position of target binary barcode pattern in the foreground image, wherein the target barcode image includes a target barcode pattern corresponding to the target binary barcode pattern. Thereafter, a correction step is performed to correct the target barcode pattern of the target barcode image in accordance with a plurality of corner coordinates of the rotated frame template pattern, a center coordinate of the rotated frame template pattern, and the value of rotation angle to obtain a corrected target barcode pattern and a corrected target barcode image, wherein the corrected target barcode pattern in the corrected target barcode image, and an alignment direction and size of the corrected target barcode pattern are the same as those of the frame template pattern.

After the pre-alignment processing step, an alignment step is performed. In the step, at first, a binarization process is performed on the corrected target barcode image to obtain a corrected binary target barcode image, wherein the corrected binary target barcode image includes a corrected binary target barcode pattern. Then, a plurality of data boundary patterns of the corrected binary target barcode pattern is found by using the data boundary patterns of the one of the barcode template patterns and the connected component labeling algorithm. Thereafter, a validity determination step is performed to determine if a geometric condition of each of the data boundary patterns of the corrected binary target barcode pattern matches a first predetermined geometric requirement to provide a first determination result. When the first determination result is yes, a value of a center coordinate of the corrected binary target barcode pattern is calculated in accordance with coordinates of the data boundary patterns of the corrected binary target barcode pattern. Then, a shift vector is calculated in accordance with a value of the center coordinate of the rotated frame template pattern and the value of the center coordinate of the corrected binary target barcode pattern. Thereafter, the corrected binary target barcode pattern is moved in the corrected binary target barcode image according to the shift vector to obtain a shifted target barcode pattern, wherein the shifted target barcode pattern includes a plurality of shifted data boundary patterns and a plurality of shifted data space patterns. Then, a plurality of first virtual areas is defined on the shifted target barcode pattern in accordance with values of coordinates of the blank area patterns of the barcode template patterns. Thereafter, a maximum background area is selected from the first virtual areas, wherein the maximum background area is one of the first virtual areas and has a biggest background area. Then, an alignment mode determination step is performed to select a matched pattern from the barcode template patterns in accordance with the position of the maximum background area. Thereafter, at least one second virtual area is defined on the shifted target barcode pattern in accordance with a value of a coordinate of at least one of data space pattern of the matched pattern. Then, a data area checking step is performed to determine if the second virtual areas are the at least one data space pattern of the shifted target barcode pattern to provide a second determination result. Thereafter, a plurality of value data areas on the shifted target barcode pattern are defined in accordance with the at least one data space pattern and the data boundary pattern of the shifted target barcode pattern, when the second determination result is yes. Then, a barcode value recognition step is performed to recognize values of the target binary barcode pattern in accordance with patterns in the value data areas.

According to an embodiment of the present invention, when the computer program product is downloaded by a computer, the computer can perform the barcode recognition method described above.

It can be known from the above descriptions that the embodiments of the present invention can exclude overlapped micro barcodes and micro barcodes which cannot be identified, and perform analysis on the rest micro barcodes to determine alignment modes and information validity of the rest micro barcodes, thereby improving of the speed and accuracy of the recognition of the micro barcodes.

BRIEF DESCRIPTION OF THE DRAWINGS

In order to make the foregoing as well as other aspects, features, advantages, and embodiments of the present invention more apparent, the accompanying drawings are described as follows:

FIG. 4 illustrates a flow chart showing the pre-alignment processing step in accordance with an embodiment of the present invention;

DETAILED DESCRIPTION

The foregoing and other descriptions, features and functions of the present invention will be clearly shown in the following detailed description of embodiments with reference to the accompanying drawings.

Figure 1:
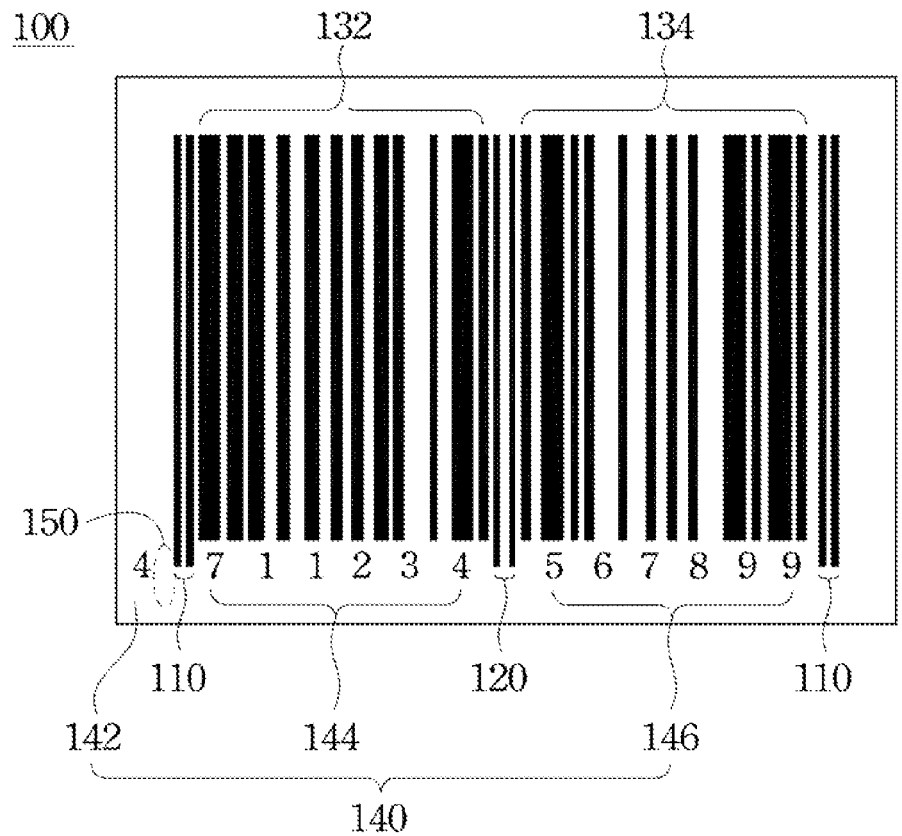
FIG. 1 illustrates a structure of a pattern of a micro barcode in accordance with an embodiment of the present invention.

Referring to FIG. 1, FIG. 1 illustrates a structure of a pattern on a micro barcode 100 in accordance with an embodiment of the present invention. In this embodiment, the form of the micro barcode 100 is EAN, and the micro barcode 100 includes data boundary patterns 110, a data space pattern 120, value patterns 132 and 134, and a number pattern 140. The value patterns 132 and 134 are located between the data boundary patterns 110 and separated by the data space pattern 120. The number pattern 140 is located below the value patterns 132 and 134, and includes a plurality of number sets 142, 144, and 146, wherein the number set 142 includes one number being a part of an area code. A blank area pattern is located between the number set 142 and the data space pattern 120. In this embodiment, the blank area pattern 150 is used to identify an alignment mode of the micro barcode 100, thus that the blank area pattern 150 is also referred to as alignment mode identification pattern.

It is noted that the EAN barcodes are used for exemplarily illustrating a barcode recognition method in this embodiment. However, the embodiments of the present invention are not limited thereto.

Figure 2:
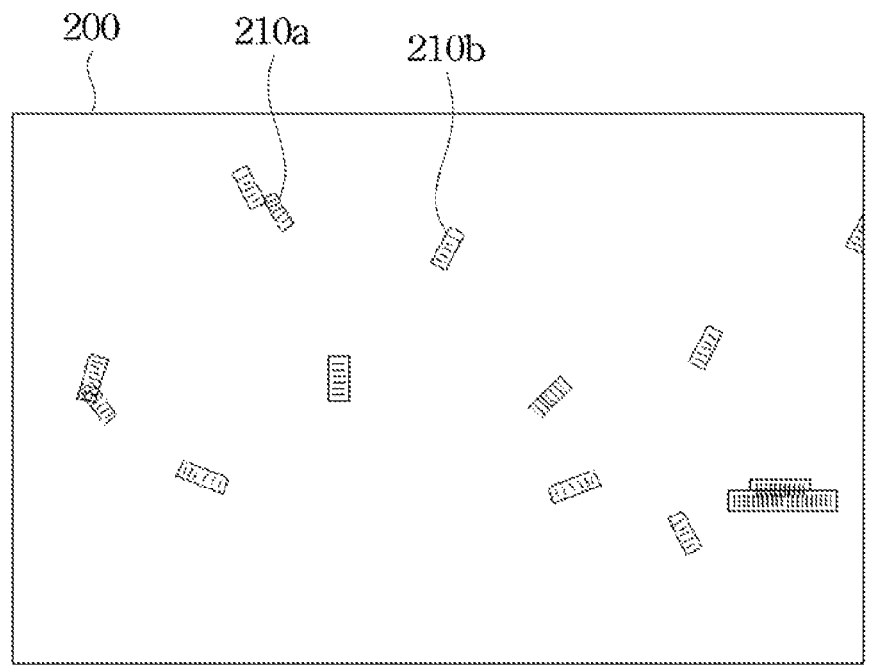
FIG. 2 shows a barcode image of a regent vessel in accordance with an embodiment of the present invention.

Referring to FIG. 2, FIG. 2 shows a barcode image 200 of a regent vessel in accordance with an embodiment of the present invention, wherein the barcode image 200 is an image of a regent vessel captured by a image capture device (for example, an electron microscope). The barcode image 200 can be a mono image or a color image. The barcode image 200 includes a plurality of barcode patterns, and the barcode patterns include connected (or overlapped) barcode patterns 210a and single (unconnected) barcode patterns 210b.

Figure 3:
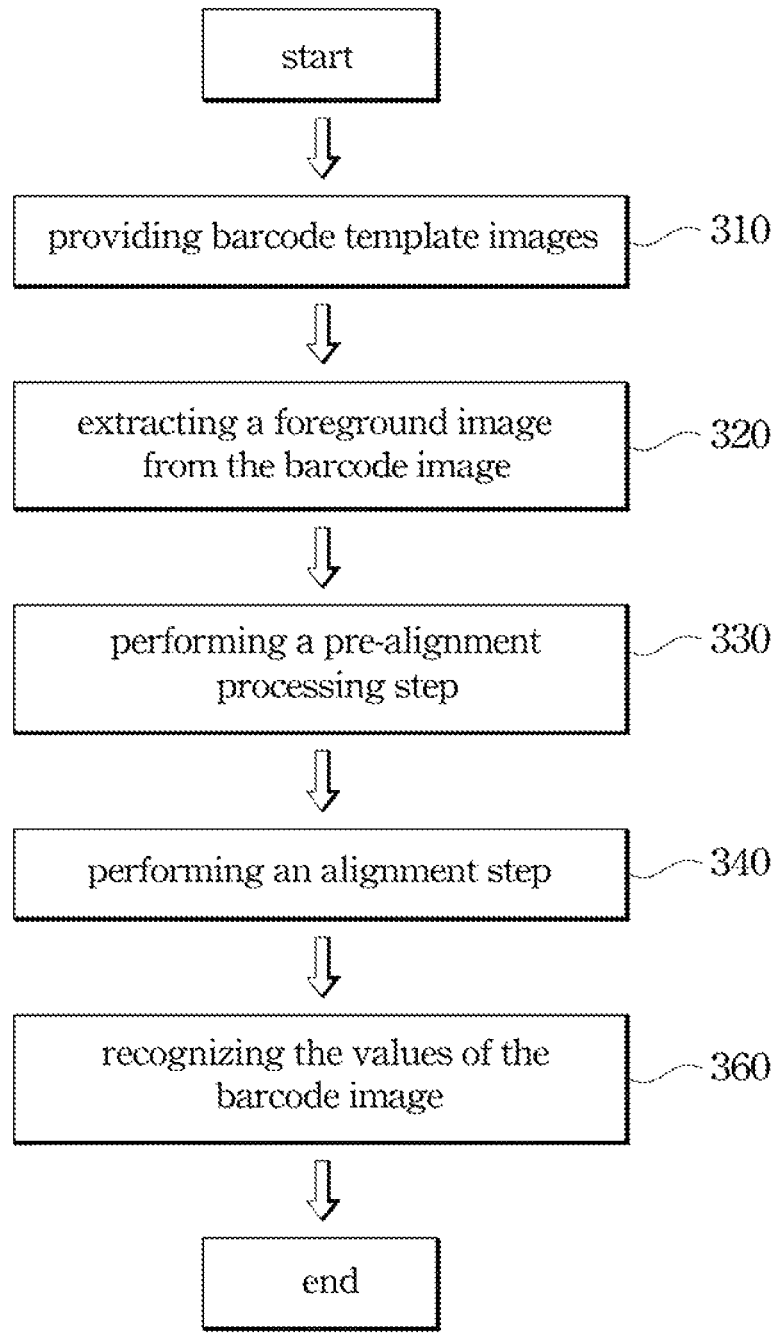
FIG. 3 illustrates a flow chart showing a barcode recognition method in accordance with an embodiment of the present invention.
Figure 3A:
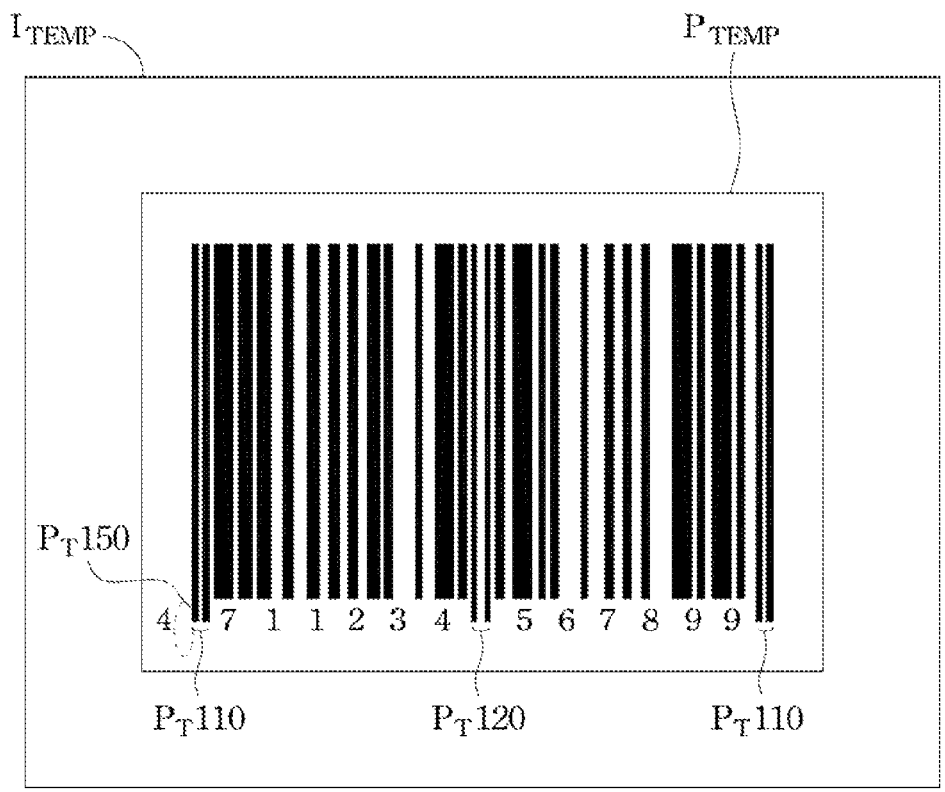
FIG. 3a and FIG. 3b illustrate alignment modes of the micro barcode in accordance with an embodiment of the present invention.
Figure 3B:
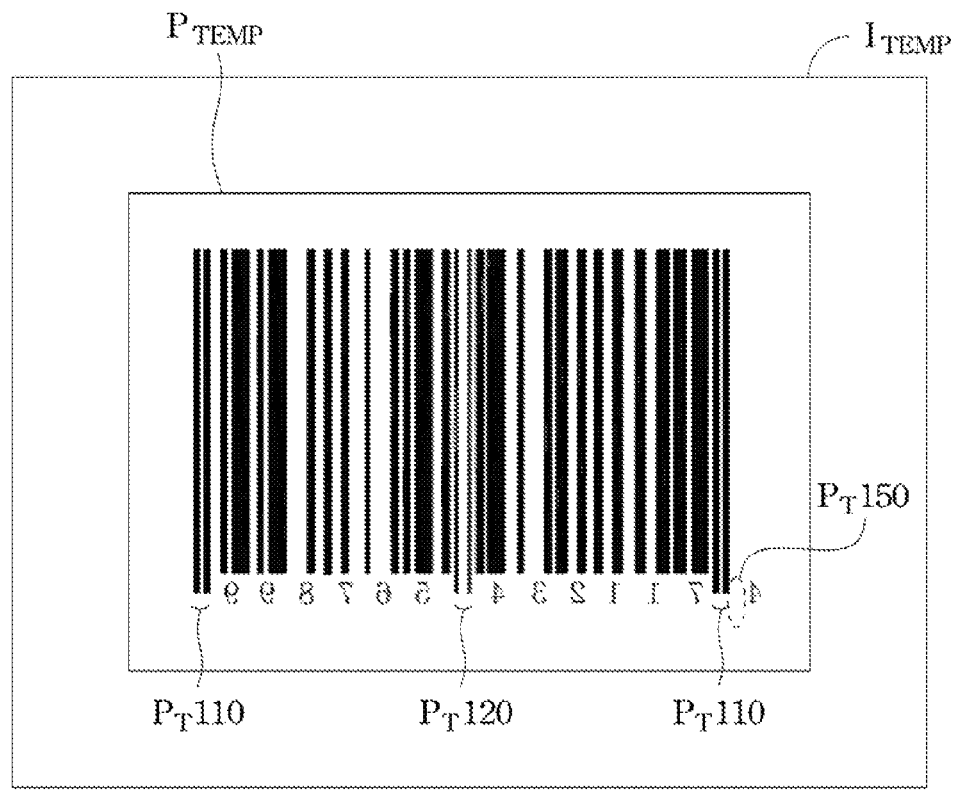

Referring to FIG. 3, FIG. 3 illustrates a flow chart showing a barcode recognition method 300 in accordance with an embodiment of the present invention. The barcode recognition method 300 is used to recognize the value patterns 132 and 134 of the micro barcode 100, and to obtain values of the micro barcode 100 in accordance with the value patterns 132 and 134. In the barcode recognition method 300, at first, a template providing step 310 is performed to provide a plurality of barcode template images. The barcode template images are determined in accordance with alignment modes in which the micro barcode 100 may be presented. For example, the micro barcode 100 has two alignment modes with respect to the value patterns 132 and 134, as shown in FIG. 3a and FIG. 3b.

Each of the barcode template images $I_{TEMP}$ includes a barcode template pattern $P_{TEMP}$. The structure of the barcode template pattern $P_{TEMP}$ is similar to the micro barcode 100. For example, the barcode template pattern $P_{TEMP}$ includes data boundary patterns $P_T110$, a data space pattern $P_T120$, and a blank area pattern $P_T150$, wherein the positions of the blank area patterns $P_T150$ of the barcode template pattern $P_{TEMP}$ are different from each other. For example, in FIG. 3a, the blank area pattern $P_T150$ is located at the bottom-left corner of the barcode template image $I_{TEMP}$, and in FIG. 3b, the blank area pattern $P_T$150 is located at the bottom-right corner of the barcode template image $I_{TEMP}$, because the barcode template image $I_{TEMP}$ in FIG. 3b is a mirror image of the barcode template image $I_{TEMP}$ in FIG. 3a.

In this embodiment, each image may correspond to a X-Y coordinate plane to enable each point in the image to have a coordinate value, wherein the origin of the X-Y coordinate is located at the top-left corner of the image, and the X-axis is the horizontal edge of the image, and the Y-axis is the vertical edge of the image.

In addition, the barcode template pattern $P_{TEMP}$ of this embodiment includes the value patterns 132 and 134, but in the other embodiments of the present invention, the barcode template pattern $P_{TEMP}$ may not include the value patterns.

Figure 3C:
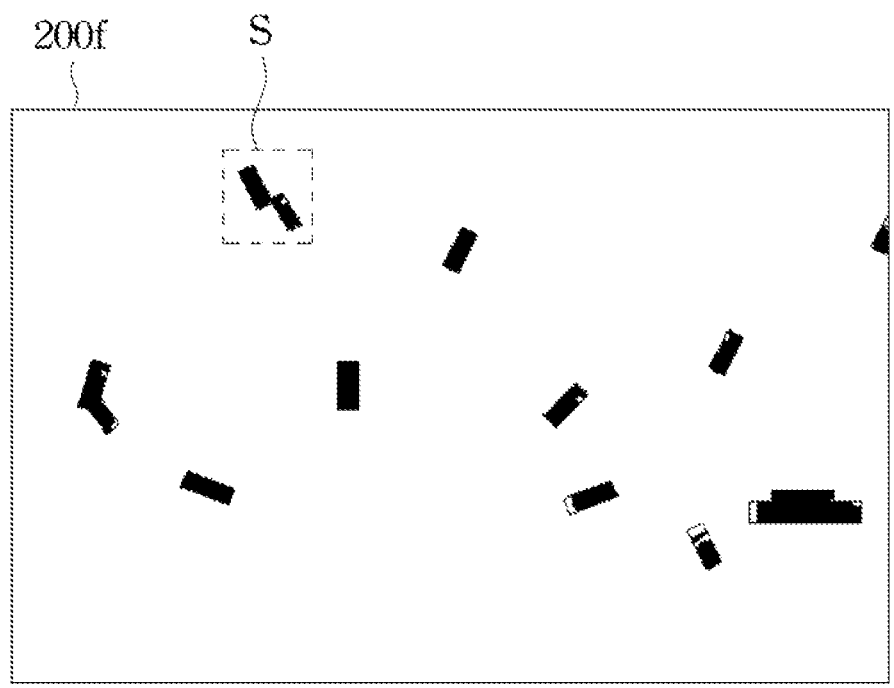
FIG. 3c shows a foreground image of the barcode image in accordance with an embodiment of the present invention.

After the template providing step 310, a foreground extraction step 320 is performed to extract a foreground image from the barcode image 200. In this embodiment, the foreground extraction step 320 performs a binarization process on the barcode image 200 to obtain the foreground image 200f of the barcode image 200, as shown in FIG. 3c. Thereafter, a pre-alignment processing step 330 and an alignment step 340 are performed to exclude barcode patterns which cannot be treated, and to determine an alignment mode of a target barcode pattern to be treated.

Referring to FIG. 4, FIG. 4 illustrates a flow chart showing the pre-alignment processing step 330 in accordance with an embodiment of the present invention. In the pre-alignment processing step 330, at first, a single barcode finding step 331 is performed to exclude connected (or overlapped) barcode patterns in the foreground image 200f, thus that single (unconnected) barcode patterns can be found. In this embodiment, the single barcode finding step 331 at first uses a connected component labeling (CCL) algorithm to find an approximate shape S of each of the foreground objects. The foreground object may be connected (or overlapped) barcode patterns or a single barcode pattern. Thereafter, a single barcode pattern is found by using a frame pattern of the barcode template pattern $P_{TEMP}$ (also referred to as frame template pattern in the following descriptions). For example, it is determined that if a geometric condition of the foreground object matches a geometric condition of the frame template pattern. When the determination result is yes, the foreground object is considered as a single barcode pattern. In this embodiment, the geometric condition of the frame template pattern may be a length range, a width range, or an aspect ratio range respectively determined in accordance with the length of the frame template pattern, the width of the frame template pattern, and the aspect ratio of the frame template pattern.

Figure 4A:
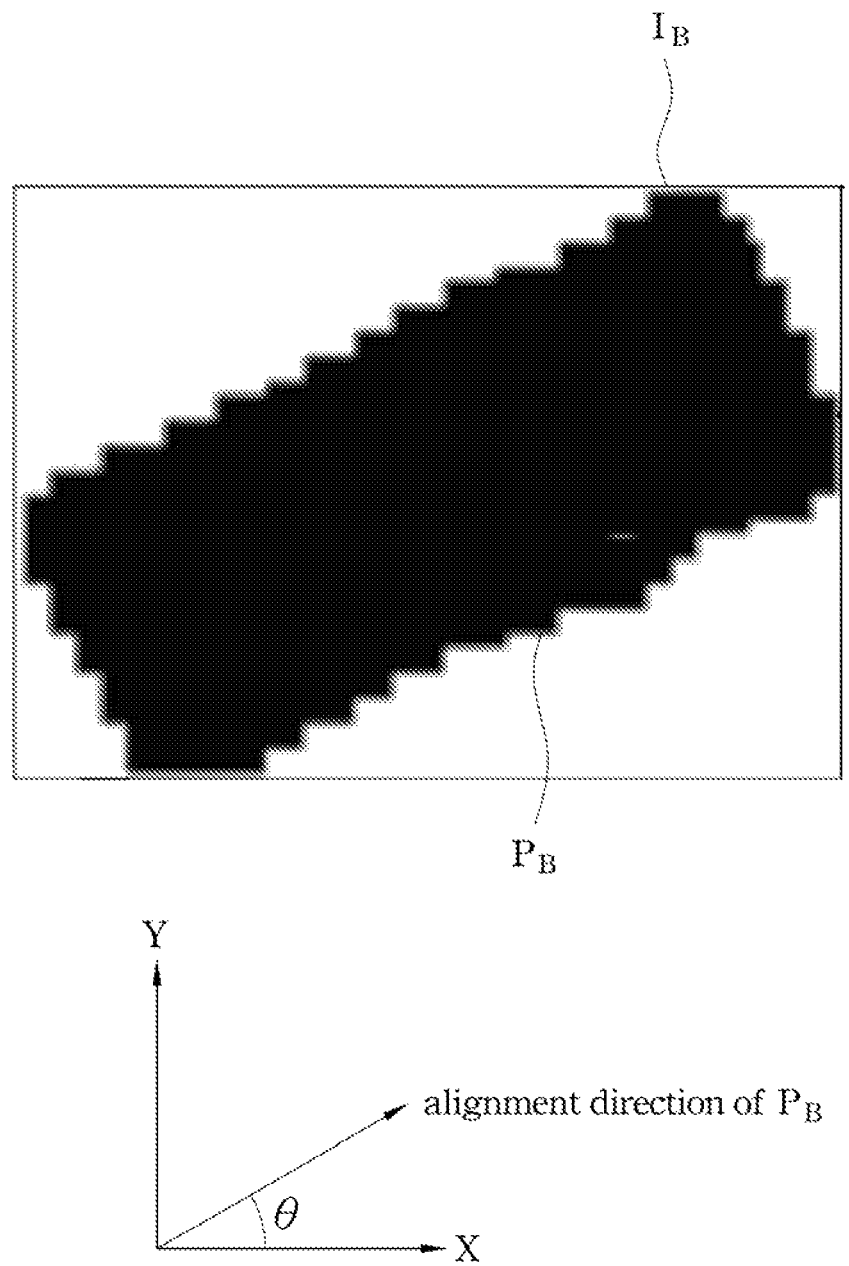
FIG. 4a shows a binary image of a target barcode pattern in accordance with an embodiment of the present invention.

After the single barcode finding step 331, a target barcode pattern selection step 332 is performed to select a target barcode pattern (desired to be treated or recognized) from the single barcode patterns in the foreground image 200f. Then, an image extracting step 333 is performed to extract a binary image of the target barcode pattern (also referred to as target binary barcode image in the following descriptions) from the foreground image 200f, as shown in FIG. 4a, wherein the target binary barcode image $I_B$ includes a target binary barcode pattern $P_B$. In this embodiment, the target binary barcode image $I_B$ has a size the same as that of the barcode template image $I_{TEMP}$ for convenience of performing following steps.

Then, a rotation angle calculating step 334 is performed to calculate a value of an angle (also referred to as rotation angle) between an alignment direction of the target binary barcode pattern $P_B$ (direction of a long axis of a pattern) and an alignment direction of a frame template pattern (e.g., frame pattern of the barcode template pattern $P_{TEMP}$).

Figure 4B:
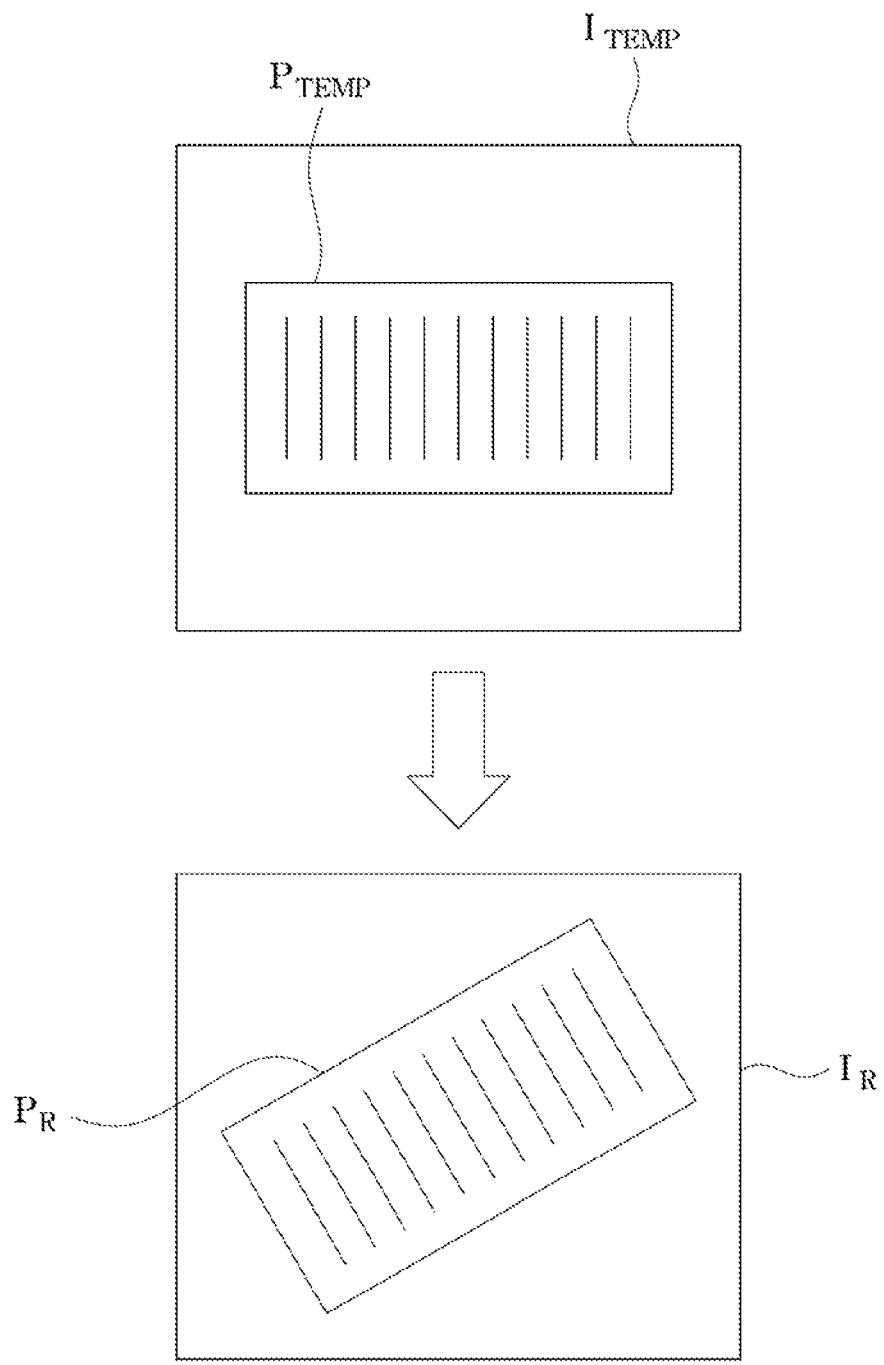
FIG. 4b shows a rotation of a frame template pattern in accordance with an embodiment of the present invention.

In this embodiment, because an alignment direction of a frame template pattern is parallel to a horizontal edge of the barcode template image $I_{TEMP}$ this embodiment uses a Hough transform algorithm to calculate a value of an angle θ between the alignment direction of the target binary barcode pattern $P_B$ and the horizontal edge of the barcode template image $I_{TEMP}$ wherein the angle θ is considered as the rotation angle. After obtaining the value of the rotation angle, a rotating step 335 is performed to rotate the frame template pattern by the value of the rotation angle by using a center point of the frame template pattern as a center to obtain a rotated frame template image $I_R$, as shown in FIG. 4b, wherein the rotated frame template image $I_R$ includes a rotated frame template pattern $P_R$.

Then, an image extracting step 336 is performed to extract a target barcode image from the barcode image 200 in accordance with the position of target binary barcode pattern in the foreground image 200f, wherein the target barcode image includes a target barcode pattern corresponding to the target binary barcode pattern. In this embodiment, the target barcode image extracted by the image extracting step 336 has a size substantially the same as that of the barcode template image $I_{TEMP}$ for convenience of performing following steps.

Thereafter, a correction step 337 is performed to correct the target barcode pattern of the target barcode image in accordance with corner coordinates of the rotated frame template pattern $P_R$, a center coordinate of the rotated frame template pattern $P_R$, and the value of rotation angle θ by using an Affine Transform algorithm or an Image Warp algorithm.

In this embodiment, because the shape of the barcode is rectangular, the rotated frame template pattern $P_R$ has four corners, and the four corners have four corner coordinates in the rotated frame template image $I_R$ This embodiment uses the values of the four corner coordinates to correct (or map) values of four corner coordinates of the target barcode pattern in the target barcode image. Similarly, a center of the rotated frame template pattern $P_R$ has a center coordinate value in the barcode template image $I_{TEMP}$, and this embodiment uses the center coordinate value to correct (or map) a coordinate value of a center of the target barcode pattern in the target barcode image. It is noted that the alignment direction and the size of the corrected target barcode pattern are the same as those of the frame template pattern $P_R$.

Figure 5A:
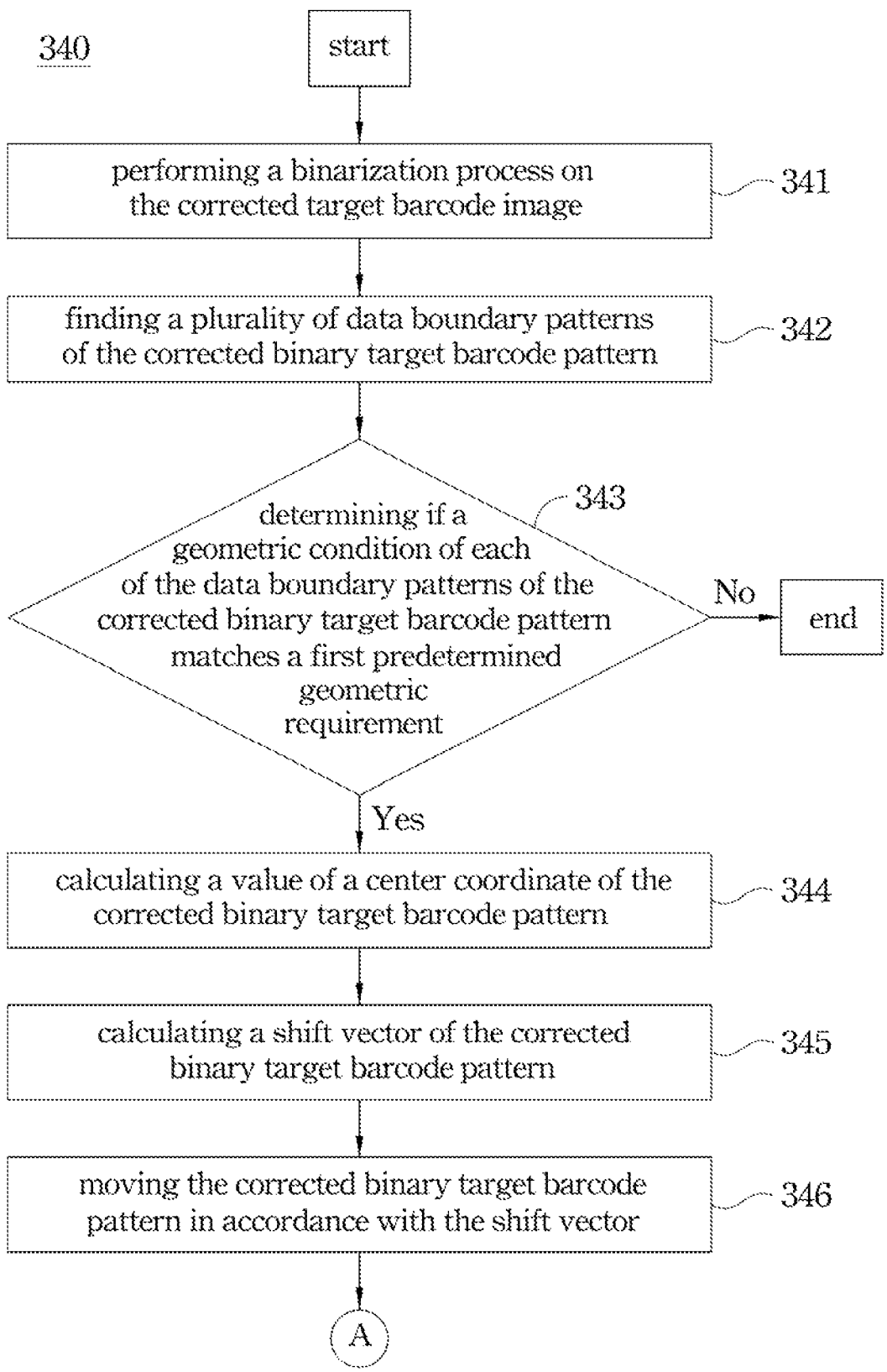
FIGS. 5a-5b illustrate flow charts showing the alignment step in accordance with an embodiment of the present invention.
Figure 5B:
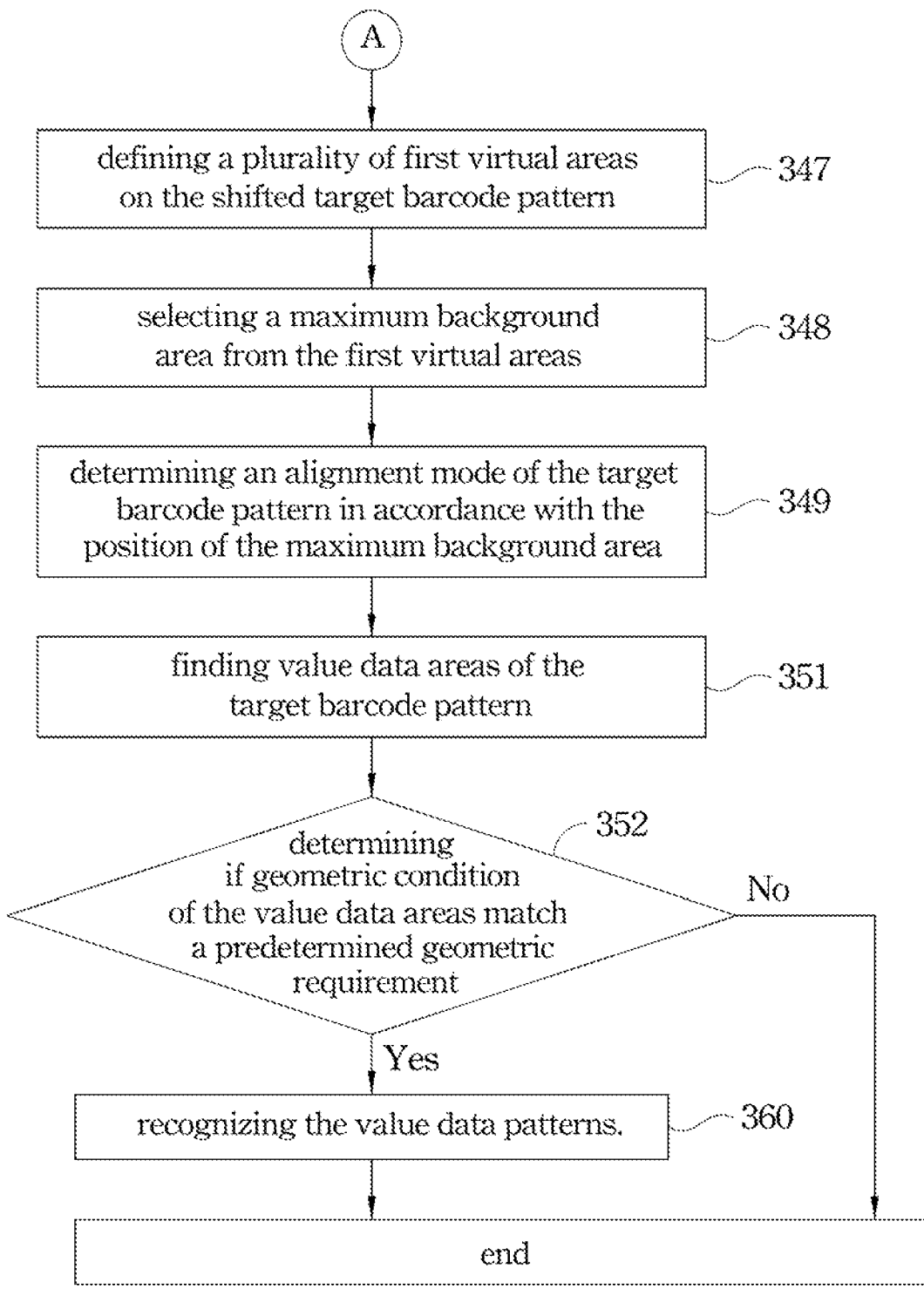
Figure 5C:
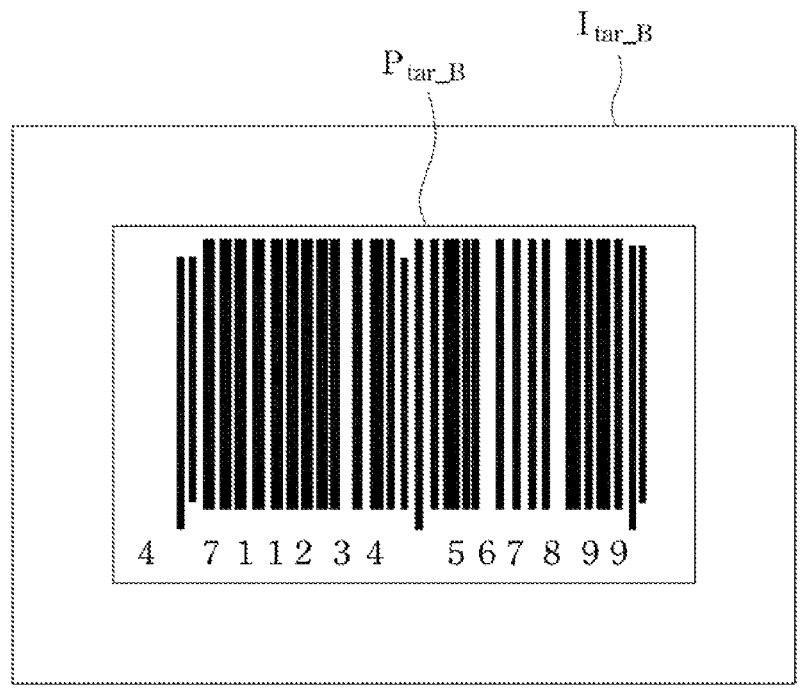
FIG. 5c shows a corrected binary target barcode image in accordance with an embodiment of the present invention.

After the pre-alignment processing step 330, an alignment step 340 is performed. Referring to FIGS. 5a-5b, FIGS. 5a-5b illustrate flow charts showing the alignment step 340 in accordance with an embodiment of the present invention. In the alignment step 340, at first, a binarization step 341 is performed to binarize the corrected target barcode image to obtain a corrected binary target barcode image $I_{tar\_B}$, wherein the corrected binary target barcode image $I_{tar\_B}$ includes a corrected binary target barcode pattern $P_{tar\_B}$, as shown in FIG. 5c.

Figure 5D:
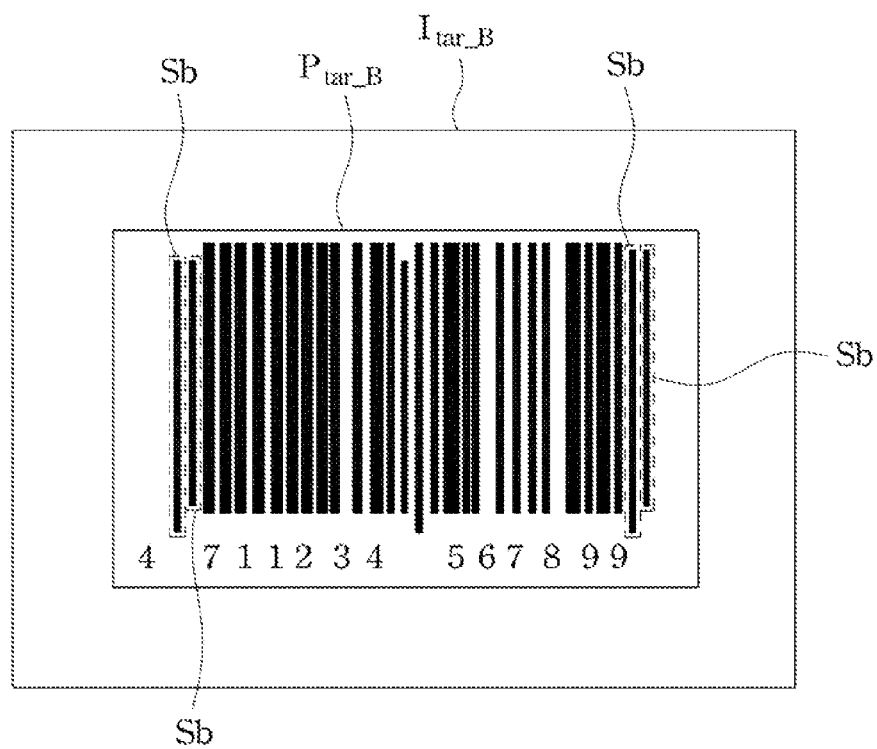
FIG. 5d illustrates data boundary patterns of a corrected binary target barcode image in accordance with an embodiment of the present invention.

Thereafter, a data boundary pattern finding step 342 is performed to find data boundary patterns of the corrected binary target barcode pattern. In the data boundary pattern finding step 342, as first, the connected component labeling algorithm is used to obtain approximate shapes of the foreground objects in the corrected binary target barcode image $I_{tar\_B}$. Then, data boundary patterns Sb of the corrected binary target barcode image $I_{tar\_B}$ in accordance with positions (or coordinate values) of boundary patterns $P_T$110 of the barcode template pattern $P_{TEMP}$, as shown in FIG. 5d.

Then, a validity determination step 343 is performed to determine if the data boundary patterns Sb of the corrected binary target barcode image $S_{tar\_B}$ are valid. In this embodiment, the validity determination step 343 determines the validity of the data boundary patterns Sb in accordance with the geometric conditions of the data boundary patterns Sb. For example, in the validity determination step 343, at first, an area value of each of the data boundary patterns Sb is calculated. Thereafter, it is determined that if the area value of each of the data boundary patterns Sb is bigger than a predetermined area threshold. When each of the area values of the data boundary patterns Sb of the corrected binary target barcode image $I_{tar\_B}$ is bigger than the predetermined area threshold, it is considered that the data boundary patterns Sb have higher validity. In contrast, when each of the area values of the data boundary patterns Sb of the corrected binary target barcode image $I_{tar\_B}$ is smaller than the predetermined area threshold, it is considered that the data boundary patterns Sb have lower validity, and thus the target barcode pattern corresponding to the corrected binary target barcode image $I_{tar\_B}$ is excluded.

Then, a center point calculation step 344 is performed to calculate a coordinate value of a center of the target barcode pattern in accordance with the data boundary patterns of the corrected binary target barcode image $I_{tar\_B}$. In this embodiment, the center point calculation step 344 averages the coordinate values of the corners of the data boundary patterns of the corrected binary target barcode image $I_{tar\_B}$ to obtain the coordinate value of a center of the target barcode pattern.

Thereafter, a shift vector calculating step 345 is performed to calculate a shift vector between the rotated frame template pattern $P_R$ and the corrected binary target barcode pattern $P_{tar\_B}$. In this embodiment, the shift vector calculating step 345 calculates the shift vector in accordance with the coordinate value of the center of the rotated frame template pattern $P_R$ and the coordinate value of the center of the corrected binary target barcode pattern $P_{tar\_B}$.

Then, a moving step 346 is performed to move the corrected binary target barcode pattern $P_{tar\_B}$ for the shift vector, thus that the position of the corrected binary target barcode pattern $P_{tar\_B}$ is the same as that of the barcode template pattern $P_{TEMP}$. In the following descriptions, the moved corrected binary target barcode pattern $P_{tar\_B}$ is referred to as "shifted corrected binary target barcode pattern $P_{shift\_tar\_B}$", and the image including the shifted corrected binary target barcode pattern $P_{shift\_tar\_B}$ is referred to as "shifted corrected binary target barcode image $I_{shift\_tar\_B}$".

Thereafter, an alignment mode identification pattern finding step 347 is performed to find an alignment mode identification pattern of the target barcode pattern. In this embodiment, the alignment mode identification pattern finding step 347 defines virtual areas on the shifted corrected binary target barcode pattern $P_{shift\_tar\_B}$ in accordance with the positions and the sizes of the blank area patterns $P_T150$ of all the barcode template patterns $P_{TEMP}$. For example, because the alignment mode identification patterns (blank area patterns) may be located at the bottom-left corner or the bottom-right corner of the barcode template pattern $P_{TEMP}$, the alignment mode identification pattern finding step 347 defines four virtual areas VA1, VA2, VA3, and VA4 on the shifted corrected binary target barcode pattern $P_{shift\_tar\_B}$ in accordance with the positions and the sizes of the blank area patterns $P_T150$ of the barcode template patterns $P_{TEMP}$, as shown in FIG. 5e, wherein the virtual areas VA1, and VA2 are representations of the positions of the blank area patterns $P_T150$ when the barcode template patterns $P_{TEMP}$ are in a normal mode, and the virtual areas VA3, and VA4 are representations of the positions of the blank area patterns $P_T150$ when the barcode template patterns $P_{TEMP}$ are in an upside-down mode.

Figure 5E:
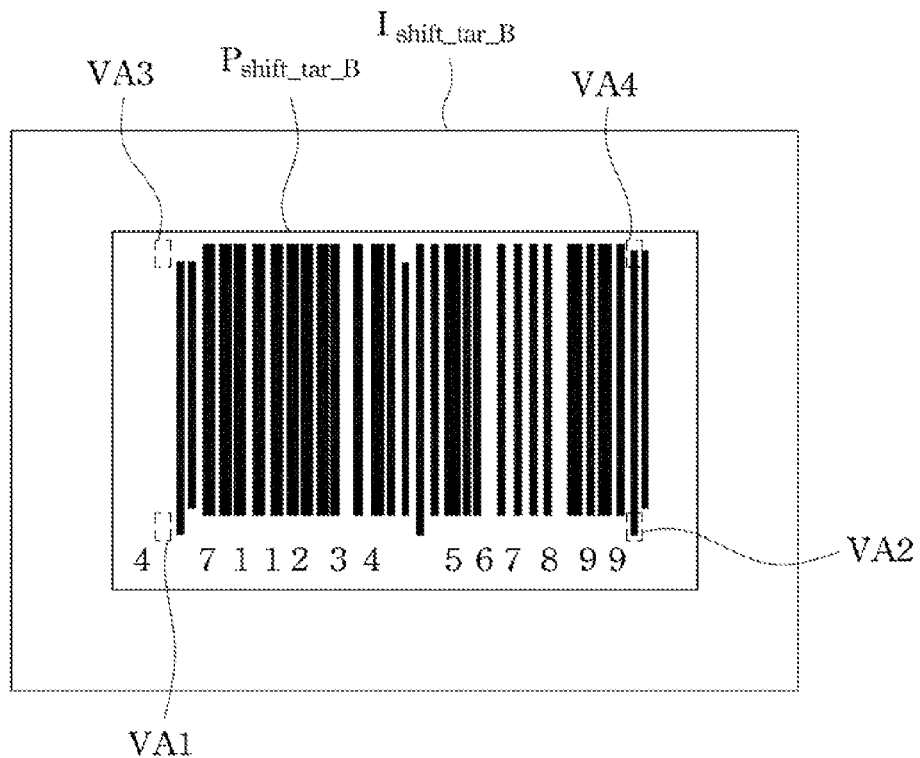
FIGS. 5e and 5f illustrate virtual areas of a shifted corrected binary target barcode pattern in accordance with an embodiment of the present invention.

Then, an area selection step 348 is performed to select a maximum background area from the virtual areas, wherein the maximum background area is one of the virtual areas and has a biggest background area (for example, the white background in FIG. 5e). In this embodiment, the virtual areas VA1 and VA3 can be considered as the maximum background area.

Thereafter, an alignment mode determination step 349 is performed to select a matched barcode template pattern from all the barcode template patterns in accordance with the positions of the maximum background areas VA1 and VA3. For example, because the maximum background areas VA1 and VA3 are located at the left side of the image $I_{shift\_tar\_B}$, the barcode template pattern in FIG. 3a is selected to be the matched pattern, and an alignment mode of the matched pattern is considered as the alignment mode of the target barcode pattern. In addition, in other embodiments of the present invention, the alignment mode determination step 349 may determine if the area value of the foreground object (for example, the black block in FIG. 5e) in each of the maximum background areas VA1 and VA3 is smaller than a predetermined area threshold (for example, 40% of the area value of the maximum background area). When the determination result is yes, the barcode template pattern in FIG. 3a is determined as the matched pattern. In contrast, when the determination result is no, the target barcode pattern corresponding to the shifted corrected binary target barcode pattern $P_{shift\_tar\_B}$ is excluded.

It is noted that because the upper part and the lower part of the value patterns of the EAN barcode are symmetrical, this embodiment may only use the virtual areas VA1 and VA2 to determine the alignment mode the target barcode pattern. However, in other embodiments of the present invention, if the barcode pattern is not symmetrical pattern, the four virtual areas VA1, VA2, VA3, and VA4 are still required to determine the alignment mode thereof.

Figure 5F:
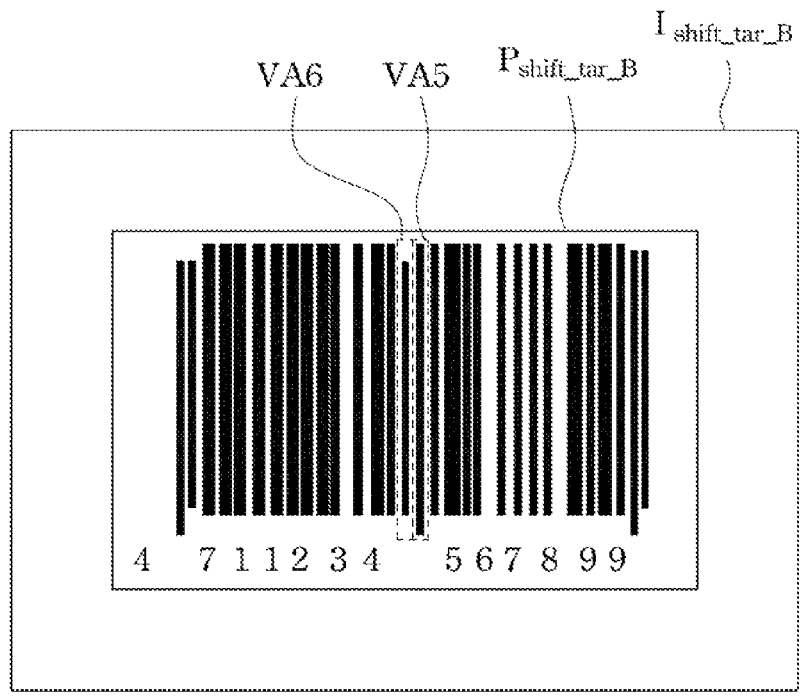

Then, a data area finding step 351 is performed to find value data areas of the target barcode pattern. In this embodiment, the data area finding step 351 defines virtual areas VA5 and VA6 on the shifted corrected binary target barcode pattern $P_{shift\_tar\_B}$ in accordance with the positions and sizes of the data space patterns $P_T120$ of the matched barcode template pattern $P_{TEMP}$, as shown in FIG. 5f.

Thereafter, a data area checking step 352 is performed to determine if the foreground object in each of the virtual areas VA5 and VA6 is a data space pattern of the target barcode pattern. In this embodiment, the data area checking step 352 determine if an area value of the foreground object in each of the virtual areas VA5 and VA6 is bigger than a predetermined area threshold value (for example, 40% of the area value of the virtual area VA5 or VA6). When area value of the foreground object in each of the virtual areas VA5 and VA6 is bigger than the predetermined area threshold value, the foreground objects of the virtual areas VA5 and VA6 are considered as the data space patterns of the target barcode pattern. Because positions of the data space patterns and the data boundary patterns are obtained, value data areas of the target barcode can be defined. The value data areas are areas at which the value patterns of the barcode are located.

Then, a barcode value recognition step 360 is performed to recognize the values of the target barcode pattern. For example, the data space patterns of this embodiment separate the area between the data boundary patterns into two value data areas, thus that the barcode value recognition step 360 can recognize the values of the target barcode pattern in accordance with the ratio between the foreground objects (black strips) and the background objects (white strips). For another example, the barcode value recognition step 360 can recognize the patterns located between the data space pattern and the boundary patterns of the shifted corrected binary target barcode image $I_{shift\_tar\_B}$ in accordance with value data patterns pre-stored in a data base to obtain values of the target barcode pattern.

It can be understood from the above descriptions that the barcode recognition method of the embodiments of the present invention can exclude overlapped micro barcodes, and perform analysis on other micro barcodes to determine alignment modes and information validity of the micro barcodes for improvement of the speed and accuracy of the recognition of the micro barcodes. In addition, the barcode recognition method is not limited to be applied on EAN barcode. The barcode recognition method of the embodiments of the present invention can greatly improve the speed and accuracy of the recognition of other kinds of micro barcodes, too.

Further, in the above embodiments, the frame template image (or pattern) is provided by the barcode template image $I_{TEMP}$ (or barcode template patterns $P_{TEMP}$). However, in other embodiments of the present invention, an additional image only includes the frame of the barcode template pattern is provided for the barcode recognition method 300.

Figure 6:
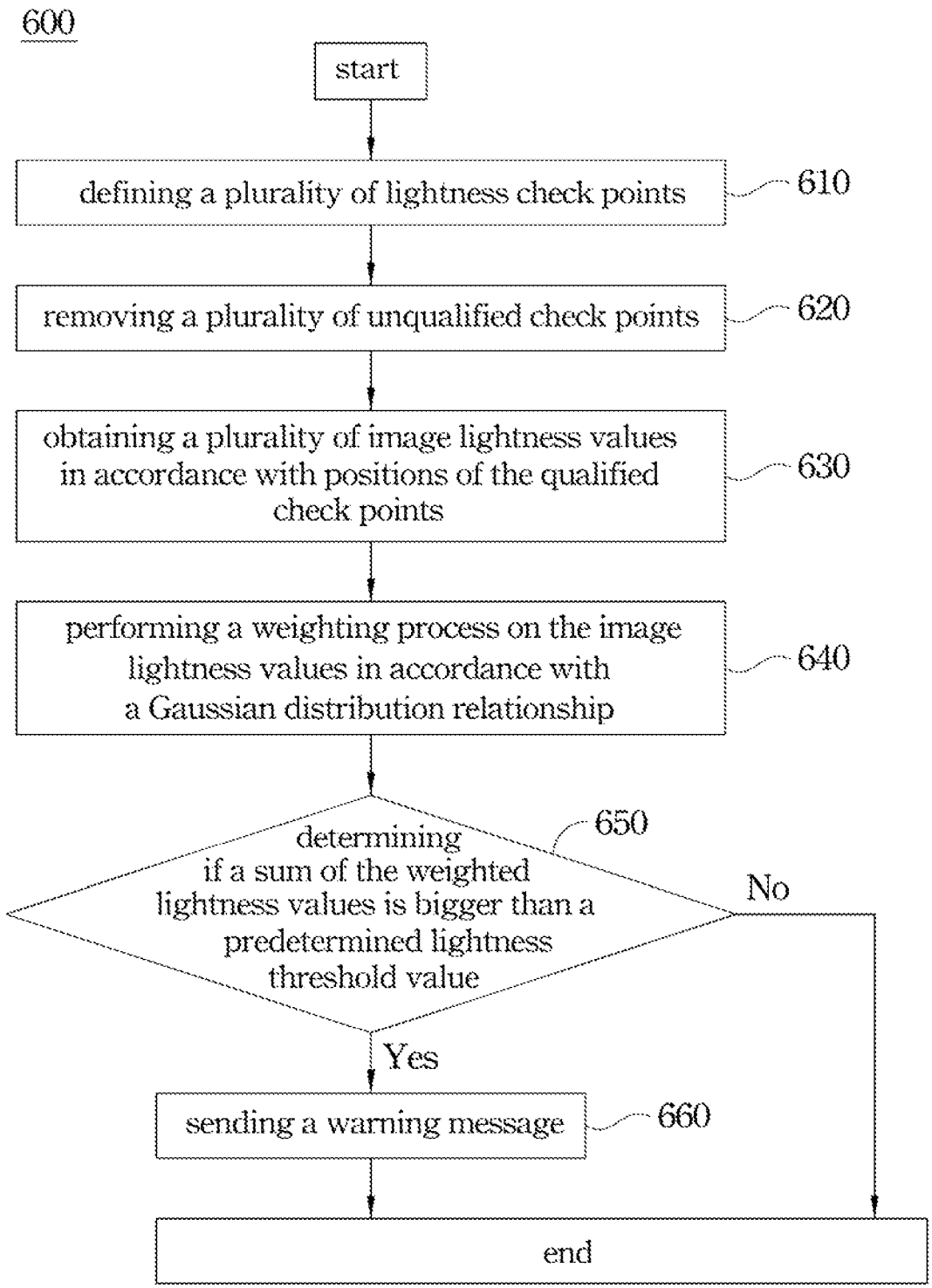
FIG. 6 illustrates a flow chart of a lightness check step in accordance with an embodiment of the present invention.
Figure 6A:
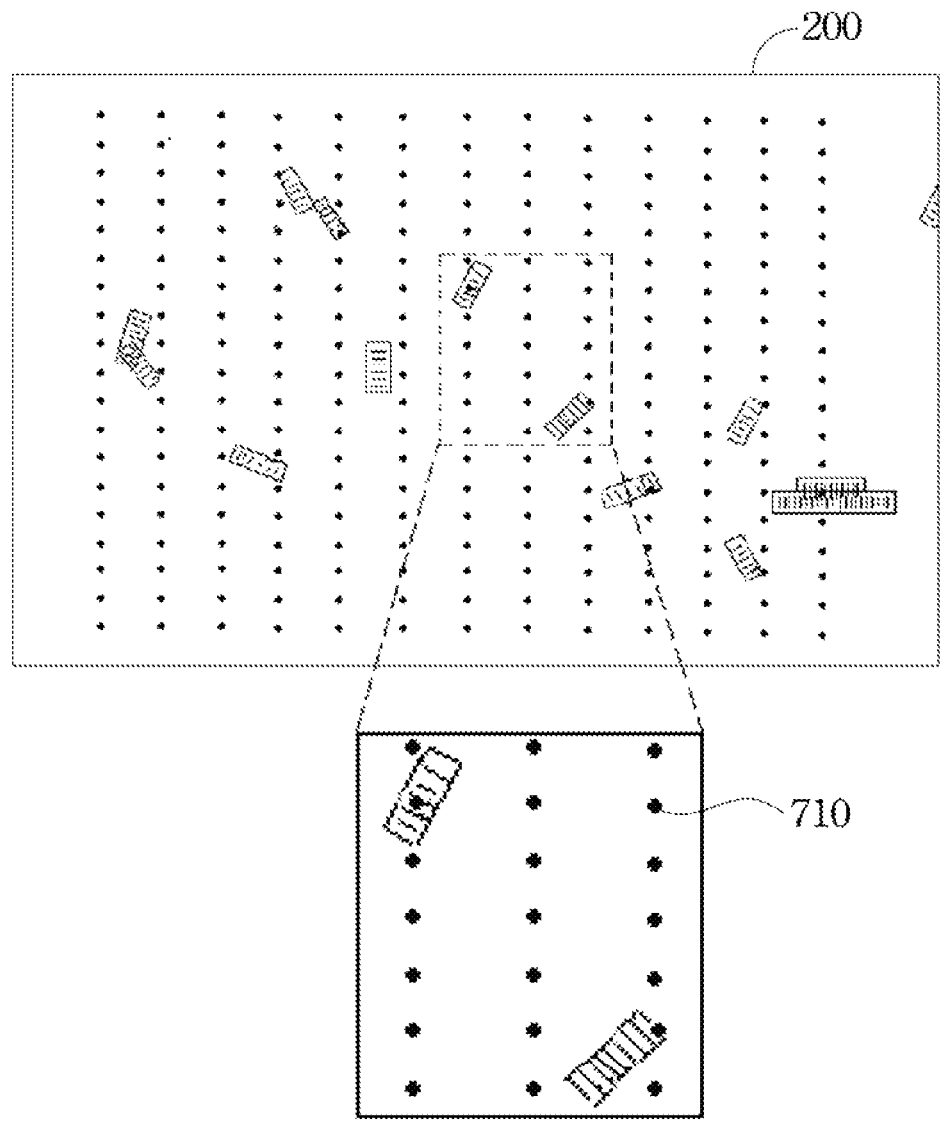
FIG. 6a shows a barcode image having lightness check points in accordance with an embodiment of the present invention.
Figure 6B:
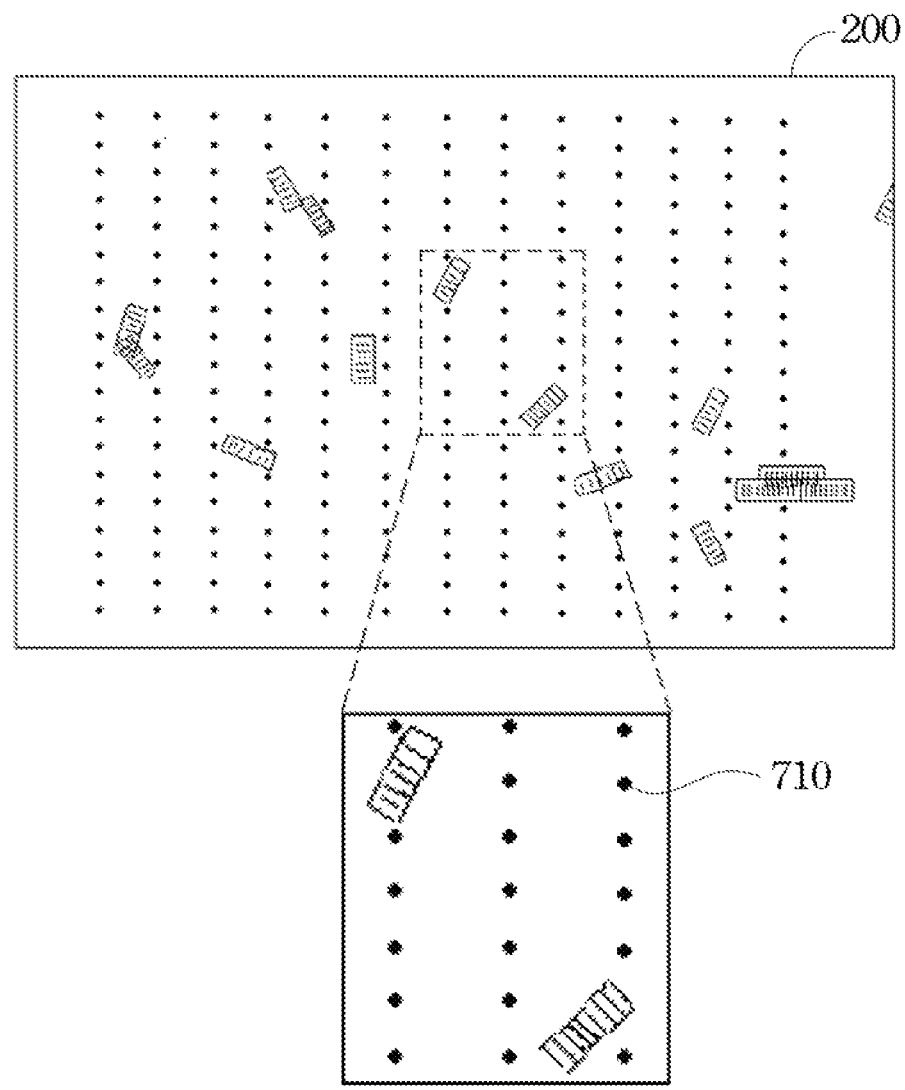
FIG. 6b shows a barcode image having qualified lightness check points in accordance with an embodiment of the present invention.

Referring to FIG. 6, FIG. 6 illustrates a flow chart of a lightness check step 600 in accordance with an embodiment of the present invention. The lightness check step 600 is used to check the lightness of the regent vessel to enable the lightness of the barcode image 200 meets the requirement of the barcode recognition method 300. In the lightness check step 600, at first, a check point defining step 610 is performed to define a plurality of lightness check points 710 on the barcode image 200, as shown in FIG. 6a. The check point defining step 610 defines the lightness check points 710 with a predetermined fixed distance thus that distances between every two adjacent lightness check points 710 are the same as each other. Then, an unqualified check point removing step 620 is performed to remove the lightness check points 710 located on foreground objects (e.g., foreground objects of the barcode pattern), as shown in FIG. 6b. Thereafter, a lightness value obtaining step 630 is performed to obtain lightness values corresponding to the lightness check points 710. Then, a weighting step 640 is performed to weight the lightness values by using a Gaussian to distribution relationship in accordance with the positions which the lightness values correspond to, wherein the lightness values corresponding to positions near the center of the barcode image have bigger weight values, and the lightness values corresponding to positions far from the center of the barcode image have smaller weight values. The lightness values are multiplied by the weight values corresponding thereto to obtain a plurality of weighted lightness values correspond to the lightness check points. Thereafter, a determination step 650 is performed to determine if a sum of the weighted lightness values is bigger than a predetermined lightness threshold value. The predetermined lightness threshold value is determined to meet the requirement of the barcode recognition method 300. Then, when the sum of the weighted lightness values is smaller than the predetermined lightness threshold value, a warning step 660 is performed to send a warning message to warn the user of the barcode recognition method 300. The warning message can be in the form of light, sound or text.

When the barcode recognition method 300 is performed, the lightness check step 600 is performed accordingly to automatically check the lightness values of the barcode image 200. When the lightness value of the barcode image 200, the lightness check step 600 can warn the user that the lightness provided by a lighting equipment is not enough.

It is noted that the barcode recognition method 300 and the lightness check step 600 can be applied in computer program products. When a computer loads the computer program products, the computer can perform the barcode recognition method 300 and the lightness check step 600.

Although the present invention has been disclosed with reference to the above embodiments, these embodiments are not intended to limit the present invention. It will be apparent to those skilled in the art that various modifications and variations may be made without departing from the spirit and scope of the present invention. Therefore, the scope of the present invention shall be defined by the appended claims.

What is claimed is:

1. A barcode recognition method, used to recognize values of a plurality of barcode data of a plurality of barcode patterns, wherein the barcode patterns are located in a barcode image and the barcode recognition method comprises:

providing a plurality of barcode template images, wherein the barcode template image comprises a plurality of barcode template patterns, and the barcode template patterns having a plurality of blank area patterns, and positions of the blank area patterns are different from each other to enable the barcode template patterns correspond to a plurality of different barcode alignment modes in a one to one manner, and each of the barcode template patterns has a plurality of data boundary patterns and at least one data space template patterns;

performing a foreground extraction step for extracting a foreground image from the barcode image, wherein the foreground extraction step performs a binarization process on the barcode image;

performing a pre-alignment processing step comprising:
performing a single barcode finding step by using a connected component labeling (CCL) algorithm and a template geometric condition of a frame template pattern to find at least one single barcode pattern in the foreground image, wherein the frame template pattern is in a frame template image, and the frame template pattern is a frame pattern of one of the barcode template patterns;

selecting a target binary barcode pattern from the at least one single barcode pattern;

extracting an image of the target binary barcode pattern from the foreground image;

performing a rotation angle calculating step for calculating a value of a rotation angle between an alignment direction of the target binary barcode pattern and an alignment direction of the frame template pattern;

performing a rotating step for rotating the frame template pattern for the value of the rotation angle with respect to a center point of the frame template pattern as a center to obtain a rotated frame template pattern and a rotated frame template image, wherein the rotated frame template pattern is in the rotated frame template image;

extracting a target barcode image from the barcode image in accordance with the position of target binary barcode pattern in the foreground image, wherein the target barcode image comprises a target barcode pattern corresponding to the target binary barcode pattern; and performing a correction step for correcting the target barcode pattern of the target barcode image in accordance with a plurality of corner coordinates of the rotated frame template pattern, a center coordinate of the rotated frame template pattern, and the value of rotation angle to obtain a corrected target barcode pattern and a corrected target barcode image, wherein the corrected target barcode pattern is in the corrected target barcode image, and an alignment direction and size of the corrected target barcode pattern are the same as those of the frame template pattern;

performing an alignment step, comprising:

performing a binarization process on the corrected target barcode image to obtain a corrected binary target barcode image, wherein the corrected binary target barcode image comprises a corrected binary target barcode pattern;

finding a plurality of data boundary patterns of the corrected binary target barcode pattern by using the data boundary patterns of the one of the barcode template patterns and the connected component labeling algorithm;

performing a validity determination step for determining if a geometric condition of each of the data boundary patterns of the corrected binary target barcode pattern matches a first predetermined geometric requirement to provide a first determination result;

when the first determination result is yes, a value of a center coordinate of the corrected binary target barcode pattern is calculated in accordance with coordinates of the data boundary patterns of the corrected binary target barcode pattern;

calculating a shift vector in accordance with a value of the center coordinate of the rotated frame template pattern and the value of the center coordinate of the corrected binary target barcode pattern;

moving the corrected binary target barcode pattern in the corrected binary target barcode image in accordance with the shift vector to obtain a shifted target barcode pattern, wherein the shifted target barcode pattern comprises a plurality of shifted data boundary patterns and a plurality of shifted data space patterns;

defining a plurality of first virtual areas on the shifted target barcode pattern in accordance with values of coordinates of the blank area patterns of the barcode template patterns;

selecting a maximum background area from the first virtual areas, wherein the maximum background area is one of the first virtual areas and has a biggest background area;

performing an alignment mode determination step for selecting a matched pattern from the barcode template patterns in accordance with the position of the maximum background area;

defining at least one second virtual area on the shifted target barcode pattern in accordance with a value of a coordinate of at least one of data space pattern of the matched pattern;

performing a data area checking step for determining if the second virtual areas are the at least one data space pattern of the shifted target barcode pattern to provide a second determination result; and defining a plurality of value data areas on the shifted target barcode pattern in accordance with the at least one data space pattern and the data boundary pattern of the shifted target barcode pattern, when the second determination result is yes; and performing a barcode value recognition step for recognizing values of the target binary barcode pattern in accordance with patterns in the value data areas.

2. The barcode recognition method of claim 1, wherein the single barcode finding step comprising:

finding at least one foreground object in the foreground image by using the connected component labeling algorithm;

determining if the geometric condition of the at least one foreground object matches the template geometric condition; and determining the at least one foreground object as the at least one single barcode pattern, when the geometric condition of the at least one foreground object matches the template geometric condition.

3. The barcode recognition method of claim 2, wherein the template geometric condition of the at least one foreground object is a width-length ratio of the at least one foreground object, and the template geometric condition is a tolerable range of width-length ratio determined in accordance with a width-length ratio of the frame template pattern.

4. The barcode recognition method of claim 1, wherein the rotation angle calculating step uses Hough transform algorithm to calculate the value of the rotation angle.

5. The barcode recognition method of claim 1, wherein the correction step uses an affine transform algorithm or an image warping algorithm to correct the target barcode pattern of the target barcode image.

6. The barcode recognition method of claim 1, wherein the target barcode pattern is EAN barcode.

7. The barcode recognition method of claim 1, wherein the validity determination step comprises:

calculating a value of an area of each of the data boundary patterns;

determining if the value of the area of each of the data boundary patterns is bigger than a predetermined area threshold; and determining the first determination result is yes, when the value of the area of each of the data boundary patterns is bigger than a predetermined area threshold value.

8. The barcode recognition method of claim 7, wherein the frame template pattern comprises a data boundary template pattern, and the predetermined area threshold value is equal to 40% of a value of an area of the data boundary template pattern.

9. The barcode recognition method of claim 1, wherein the alignment mode determination step comprises:

determining if an area of a foreground object in the maximum background area is smaller than a predetermined area threshold value; and when the area of the foreground object in the maximum background area is smaller than the predetermined area threshold value, selecting the matched pattern from the barcode template patterns in accordance with positions of the blank area patterns of the barcode template patterns and a position of the maximum background area to determine that the barcode alignment mode of the target barcode pattern is the barcode alignment mode of the matched pattern.

10. The barcode recognition method of claim 9, wherein the predetermined area threshold value is 40% of a value of an area of the maximum background area.

11. The barcode recognition method of claim 1, wherein the data area checking step comprises:

determining if a value of an area of a foreground object in each of the second virtual areas is bigger than a predetermined area threshold value; and determining that the foreground object in each of the second virtual areas is the at least one data space pattern of the shifted target barcode pattern, when the value of the area of the foreground object in each of the second virtual areas is bigger than the predetermined area threshold value.

12. The barcode recognition method of claim 11, wherein the predetermined area threshold value is equal to 40% of a value of an area of each of the second virtual areas.

13. The barcode recognition method of claim 1, further comprising a lightness check step, wherein the lightness check step comprises:
   defining a plurality of lightness check points in the barcode image, wherein distances between every two adjacent lightness check points are the same as each other;
   removing a plurality of unqualified check points among the lightness check points to obtain a plurality of qualified check points, wherein the unqualified check points are located on the barcode patterns;
   obtaining a plurality of image lightness values in accordance with positions of the qualified check points;
   performing a weighting process on the image lightness values in accordance with a Gaussian distribution relationship and positions of the qualified check points to obtain a plurality of weighted lightness values;
   determining if a sum of the weighted lightness values is bigger than a predetermined lightness threshold value to obtain a third determination result; and
   sending a warning message when the third determination result is no.

14. A computer program product stored on a non-transitory tangible computer readable recording medium, which, when executed, performs the barcode recognition method of claim 1.

* * * * *

UNITED STATES PATENT AND TRADEMARK OFFICE
CERTIFICATE OF CORRECTION

PATENT NO. : 8,590,794 B2
APPLICATION NO. : 13/802591
DATED : November 26, 2013
INVENTOR(S) : Chi-Chen Wang, Chien-Chung Tseng and Jenn-Jier Lien It is certified that error appears in the above-identified patent and that said Letters Patent is hereby corrected as shown below:

On the Title Page, Item (54) and in the Specification, Column 1, Lines 1-2, Title of the issued patent reads as "BARCODE RECOGNION METHOD AND COMPUTER PRODUCT THEREOF", but it should read as "BARCODE RECOGNITION METHOD AND COMPUTER PRODUCT THEREOF".

Signed and Sealed this
Twenty-first Day of October, 2014

Michelle K. Lee
*Deputy Director of the United States Patent and Trademark Office*